Feb. 9, 1960   E. C. MILES   2,924,485
WINDSHIELD GLASS
Filed Aug. 10, 1955   2 Sheets-Sheet 2
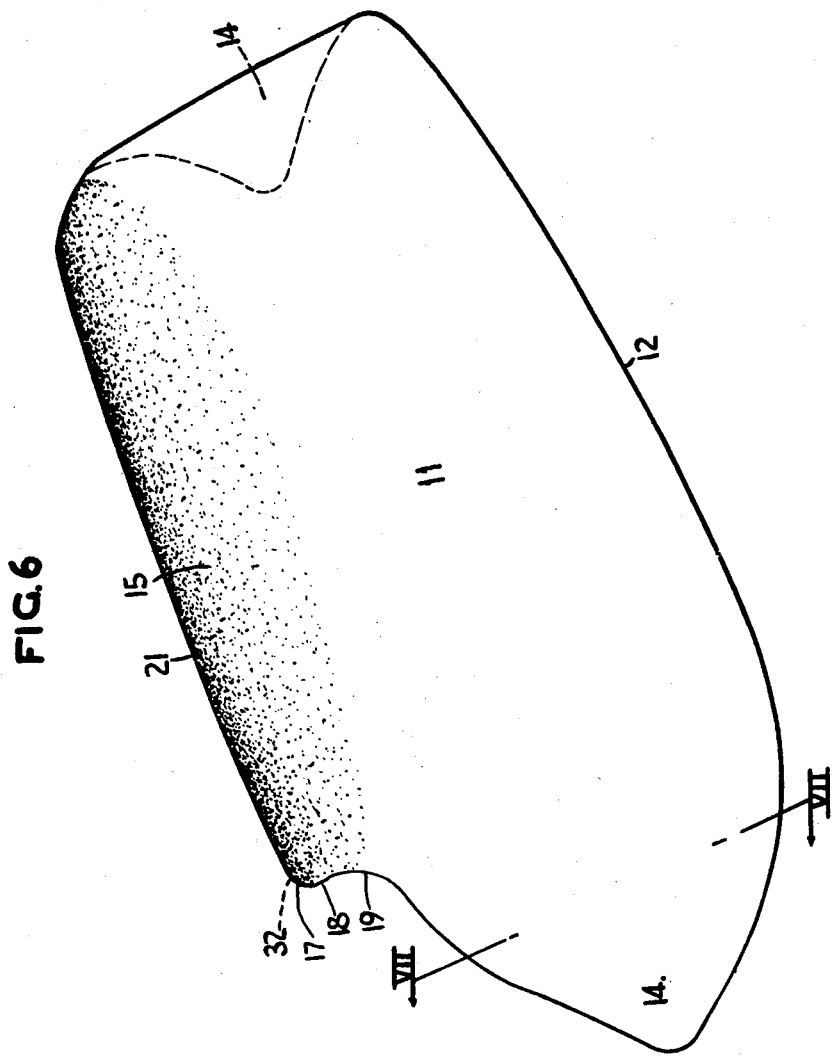
INVENTOR.
EWELL C. MILES
BY
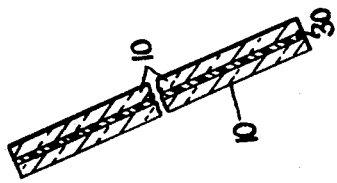
ATTORNEY

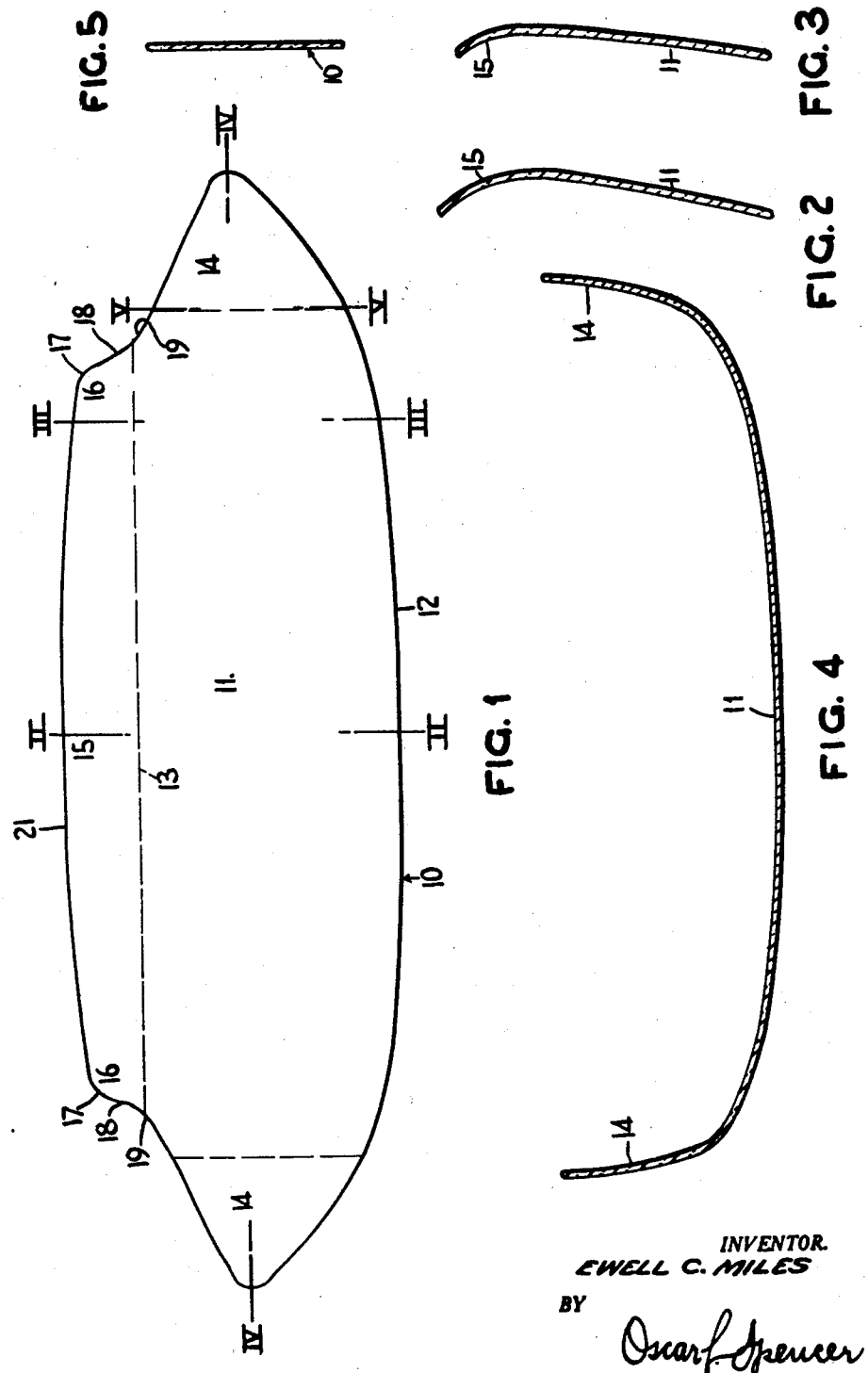

United States Patent Office 2,924,485
Patented Feb. 9, 1960

2,924,485
WINDSHIELD GLASS

Ewell C. Miles, Pittsburgh, Pa., assignor to Pittsburgh Plate Glass Company, Allegheny County, Pa., a corporation of Pennsylvania Application August 10, 1955, Serial No. 527,536

6 Claims. (Cl. 296—84)

The present invention relates to a novel construction for a glass sheet forming part of a compound bent vehicle windshield having a minimum of distortion. Such a windshield has a longitudinally extending main portion bent along its longitudinal axis rather gently to provide the portion of the windshield immediately in front of the front seat of the vehicle, merging near each longitudinal windshield extremity into severely curved regions to form wing portions extending rearwardly of the vehicle at each side thereof in spaced, substantially parallel planes to produce a "wrap around" effect at the front portion of the sides of the automobile, and containing an auxiliary portion curved transversely along one side of the main portion of the windshield to extend rearwardly in the vehicle roof.

The desires of automobile manufacturers for increasing visibility in their vehicles has resulted in successively greater areas of glass in automobiles from year to year. The last previous development prior to the present invention has resulted in windshields extending the full width of the automobile immediately in front of the front seat and into the sides of the vehicle to provide an unobstructed panoramic view from the front seat.

Such a campaign for greater unobstructed vision has developed into a demand for a single unitary panoramic windshield having an auxiliary portion extending into the roof of the automobile to extend the field of vision vertically as well as horizontally. Various attempts to produce a windshield to meet such requirements met with failure due to optical distortion believed to be inherent from bending flat glass sheets into curved patterns along two mutually perpendicular axes having non-uniform curvatures along these axes, and due to the failure to reproduce compound bends within the precise tolerances needed for duplication under high production conditions.

Prior to the present invention, it was considered impossible to prevent wrinkling in glass sheets bent to mutually perpendicular non-uniform curvatures. This wrinkling was especially prominent in the upper corners of the windshield where the glass had to be subjected to bends of such severity that the radius of curvature along a longitudinal axis was less than 8 inches and the radius of curvature along a transverse axis was less than 12 inches. The structure suggested by the present invention enables windshields to be bent sharply from the main front portion into the side wing portions and also into the auxiliary top roof portions without wrinkling the glass and while minimizing distortion. Such improved results are present even though the most severe curvatures imparted to the glass are radii of curvatures of 8 inches transversely and 4 to 5 inches longitudinally.

The novel structure for glass sheets to be used in vehicle windshields has complex longitudinal and transverse curvatures including regions of severe curvature. For the purpose of the present invention, a severe curvature is defined as one having a radius of curvature not exceeding 12 inches. By virtue of the structure suggested by the present invention, the auxiliary portion of a windshield blank which is to be bent transversely relative to the main windshield portion is limited in its length to a distance less than that separating the spaced, sharply bent regions of the windshield where the main portion is connected to the wing portions, and in its location to one wherein the longitudinal extremities of the auxiliary portion are located inboard of the sharply bent regions. Also, the ends of the auxiliary portion are cut along a curved marginal line that provides a convex portion, then a straight portion and finally a concave portion for reasons to be explained below.

It is a primary object of the invention to provide a novel structure for automotive windshield glass.

Another object of this invention is to provide a compoundly curved automotive windshield having a gently curved main portion merging near its longitudinal extremities into sharply curved regions to form wing portions extending along the sides of the vehicle rearwardly thereof and an auxiliary roof portion sharply curved transversely relative to the upper longitudinal edge of the main portion and extending rearwardly therefrom, wherein the auxiliary roof portion is so shaped as to minimize optical distortion of the final product and to facilitate its fabrication.

A typical embodiment of the present invention is described below. In the true scale drawings of a typical embodiment accompanying the description, Figure 1 is a plan view of a sheet of flat glass precut for bending to varying radii of curvature along its longitudinal and transverse axes;

Figure 2 is a transverse sectional view of the center of the glass sheet taken along the lines II—II of Figure 1 after the sheet has been bent to final shape;

Figure 3 is a transverse sectional view taken along the lines III—III of Figure 1 after the sheet has been bent to final shape;

Figure 4 is a longitudinal sectional view taken along the lines IV—IV of Figure 1 after the sheet has been bent to final shape;

Figure 5 is a transverse sectional view taken through the transverse axis defined by the minimum radius of the longitudinal glass bent along the lines V—V of Figure 1, after the sheet has been bent to final shape;

Figure 6 is a perspective view of a laminated windshield curved according to the desired shape imparted to the windshield elements as shown in the previous figures; and Figure 7 is a cross-sectional view of the windshield taken along the lines VII—VII of Figure 6.

Referring particularly to the drawings wherein the reference numerals refer to identical elements in all the figures, a flat glass sheet 10 is precut with a main central portion 11, of the modified elliptical shape delineated by the side edge 12 and the dotted line 13 shown in Figure 1, merging at its longitudinal extremities into wing portions 14. Also, an auxiliary portion 15 in the form of an elongated tab extends longitudinally a portion of the length of the main central portion 11 from the side thereof delineated by dotted line 13.

At each longitudinal extremity 16 of the auxiliary portion 15, the glass sheet is contoured along its margin to form a convexly shaped corner portion 17 merging into an intermediate, substantially straight portion 18 and finally, a concavely shaped portion 19. The latter portions 19 merge into the main central portion 11 of the sheet longitudinally inbound of the regions to be bent sharply. Such a shape facilitates cutting of blanks by an automatic cutting machine and provides a relatively long corner of glass for support by a skeleton mold used to shape the blanks.

When the glass is bent into compound shapes, the wing portions 14 are bent rearwardly relative to the longitudinal extremities of the main central portion outboard of the concavely shaped portions 19 into spaced, parallel planes substantially perpendicular to the tangential plane of the main central portion 11, and the auxiliary portion 15 is curved in the direction of the wing portions rearwardly relative to the main central portion. The plane tangential to the top extremity 21 of the auxiliary portion extending between the convexly shaped portions 17 lies at an angle relative to the planes tangential to the wing portions.

In order to avoid optical distortion and difficulty of reproducing mutually perpendicular severe bends in localized areas, the compound windshields of the present invention are so constructed that mutually perpendicular bends of relatively small radii are not required for any localized portion of the glass sheet, while providing an article that gives the overall appearance of being bent compoundly.

Since the extremities of the auxiliary portions are located longitudinally inwardly of the sharply curved regions where the main portion 11 merges into the wing portions 14, the auxiliary portion 15 does not extend into the critical regions of the glass having the most servere longitudinal curvatures. Because of the novel present construction, the wing portions 14 may be bent rather severely relative to the main central portion outside of the area substended by the transversely bent auxiliary portion. In fact, there need be no transverse curvature along the axis of most severe longitudinal bending as can be seen from Figure 5. Similarly, the transverse bending of the auxiliary portion is limited to regions wherein the longitudinal bending is relatively gentle.

Windshields of the type disclosed herein are usually formed from two sheets of glass and an interlayer of transparent plastic material, such as polyvinyl butyral, although a single sheet of tempered glass is also used. In practice, two sheets of glass are precut to their desired outlines and a layer of parting material deposited on the surface of one of the glass sheets. The sheets are mounted on a bending iron with the parting material at their interface and are bent into desired shape by a combination of heat softening and the application of mechanical forces to the heat softened glass. The bent sheets are then separated, a sheet of polyvinyl butyral, which is precut to the outline of the sheets, inserted between the glass sheets, and the assembly prepressed and laminated.

Referring to Figures 6 and 7, a laminated windshield is shown comprising a pair of compound bent glass sheets 10 and an interlayer 30 of transparent plastic. The plastic includes an auxiliary portion 32 located between auxiliary portions 15 of glass sheets 10, and dyed to limit the transmission of heat into the vehicle through the transparent portion of the roof enclosed with the present windshield construction. The dyed portion in the plastic interlayer may extend downwardly into the interlayer portion between the main portions 11 of the glass sheets in gradually reducing intensity with increasing distance from said auxiliary portion so as to refrain from causing undue eye fatigue resulting from having a sharp line of demarcation between dyed and undyed portions.

In cases where the windshields are formed of single sheets of tempered glass, the glass sheets, while still heated and immediately after bending, are quenched by exposure to rapidly moving blasts of tempering fluid which impinge on the opposite surfaces of the heated sheet simultaneously. Of course, the term "windshields" as used above is meant to cover both front and rear glazing panels for vehicles.

The description above is for illustration rather than limitation. Reference to the latter may be obtained from the accompanying claims.

What is claimed is:

1. A vehicle windshield comprising a plurality of elongated sheets of glass each having a main portion bent along its longitudinal axis gently in its central portion merging adjacent its longitudinal extremities into regions of severe curvature to form wing portions extending in one direction in spaced, substantially parallel planes, and an auxiliary portion extending longitudinally substantially parallel to said longitudinal axis a distance less than the distance between said regions of severe curvature and curved transversely of said main portion along a transverse axis of non-uniform curvature to extend in the one direction in a plane angularly disposed relative to the planes defined by the wing portions, and a thermoplastic interlayer shaped to the outline of the glass sheets and interposed between adjacent glass sheets.

2. A vehicle windshield comprising a plurality of elongated sheets of glass each having a main portion bent along its longitudinal axis gently in its central portion merging adjacent its longitudinal extremities into regions of severe curvature to form wing portions extending in one direction in spaced, substantially parallel planes, and an auxiliary portion extending longitudinally substantially parallel to said longitudinal axis a distance less than the distance between said regions of severe curvature and curved transversely of said main portion along a transverse axis of non-uniform curvature to extend in the one direction in a plane angularly disposed relative to the planes defined by the wing portions, and a thermoplastic interlayer shaped to the outline of the glass sheets and interposed between adjacent glass sheets, said interlayer being dyed in the portion of its area inserted between auxiliary portions of said glass sheets.

3. An automobile windshield comprising a pair of elongated glass sheets and a plastic interlayer of substantially the same area and outline interposed therebetween, each elongated glass sheet having a main portion bent along its longitudinally extending axis and including an auxiliary portion extending longitudinally substantially parallel to said longitudinal axis a distance less than the length of the elongated glass sheet and bent sharply transversely of said main portion along a curve of changing radius of curvature.

4. A glazing closure comprising an elongated sheet of curved glass comprising a longitudinally extending, longitudinally gently bent, transversely substantially flat main portion having a given length, a wing portion bent sharply relative to said main portion to extend substantially normally to said main portion in a given direction from each longitudinal extremity of the main portion, and an auxiliary portion having a length less than said given length and bent sharply relative to said main portion to extend at an angle to said main portion in said given direction from one side edge only of the main portion, the other side edge of the main portion forming a side edge of the curved glass sheet.

5. A laminated article comprising a pair of elongated sheets of curved glass each comprising a longitudinally extending, longitudinally gently bent, transversely substantially flat main portion having a given length, a wing portion bent sharply relative to said main portion to extend substantially normally to said main portion in a given direction from each longitudinal extremity of the main portion, and an auxiliary portion having a length less than said given length and bent sharply relative to said main portion to extend at an angle to said main portion in said given direction from one side edge only of the main portion, the other side edge of the main portion forming a side edge of the curved glass sheet, and a thermoplastic interlayer shaped to the outline of the glass sheets and interposed between adjacent glass sheets.

6. The laminated article according to claim 5, wherein the interlayer is dyed in the portion of its area inserted between auxiliary portions of said glass sheets.

(References on following page)

References Cited in the file of this patent

UNITED STATES PATENTS

| | | |
|---|---|---|
| 778,330 | Pond | Dec. 27, 1904 |
| 1,944,160 | Barker | Jan. 23, 1934 |
| 2,315,103 | Anderson | Mar. 30, 1943 |
| 2,377,849 | Binkert et al. | June 12, 1945 |
| 2,399,652 | Rappl | May 7, 1946 |
| 2,482,698 | Tillyer | Sept. 20, 1949 |
| 2,483,785 | Schottland | Oct. 4, 1949 |
| 2,551,606 | Jendrisak | May 8, 1951 |
| 2,593,525 | Beckham | Apr. 22, 1952 |
| 2,609,269 | Ryan et al. | Sept. 2, 1952 |
| 2,620,221 | Romano | Dec. 2, 1952 |
| 2,725,320 | Atkeson et al. | Nov. 29, 1955 |
| 2,817,559 | Nickles | Dec. 24, 1957 |

FOREIGN PATENTS

| | | |
|---|---|---|
| 246,162 | Switzerland | Sept. 1, 1947 |

UNITED STATES PATENT OFFICE

CERTIFICATE OF CORRECTION

Patent No. 2,924,485            February 9, 1960

Ewell C. Miles

It is hereby certified that error appears in the printed specification of the above numbered patent requiring correction and that the said Letters Patent should read as corrected below.

Column 2, line 67, for "inbound" read -- inboard --; column 3, line 27, for "substended" read -- subtended --.

Signed and sealed this 11th day of April 1961.

(SEAL)
Attest:
ERNEST W. SWIDER
Attesting Officer

ARTHUR W. CROCKER
Acting Commissioner of Patents